(12) United States Patent  
Sutherland (10) Patent No.: US 7,818,190 B1
(45) Date of Patent: Oct. 19, 2010

(54) CAMPING RESERVATION SYSTEM, METHOD AND PROGRAM

(75) Inventor: Jef Sutherland, Billings, MT (US)

(73) Assignee: Kampgrounds of America, Inc., Billings, MT (US)

( * ) Notice: Subject to any disclaimer, the term of this patent is extended or adjusted under 35 U.S.C. 154(b) by 1413 days.

(21) Appl. No.: 10/707,374

(22) Filed: Dec. 9, 2003

(51) Int. Cl.
*G06Q 99/00* (2006.01)

(52) U.S. Cl. .................. 705/5; 705/6; 705/8; 705/9; 296/156

(58) Field of Classification Search ............ 705/5, 705/7, 8; 296/156
See application file for complete search history.

(56) References Cited

U.S. PATENT DOCUMENTS

| | | | |
|---|---|---|---|
| 3,446,278 A * | 5/1969 | Heinrich | 165/155 |
| 4,014,586 A * | 3/1977 | Swofford | 296/169 |
| 5,581,461 A | 12/1996 | Coll et al. | 705/5 |
| 5,864,818 A | 1/1999 | Feldman | 705/5 |
| 5,948,040 A * | 9/1999 | DeLorme et al. | 701/201 |
| 6,157,315 A | 12/2000 | Kokubo et al. | 340/5.42 |
| 6,509,829 B1 | 1/2003 | Tuttle | 340/10.1 |
| 2002/0002599 A1 * | 1/2002 | Arner et al. | 709/219 |
| 2002/0099574 A1 * | 7/2002 | Cahill et al. | 705/5 |
| 2003/0162536 A1 * | 8/2003 | Panico | 455/422 |
| 2004/0080510 A1 * | 4/2004 | Inokuchi et al. | 345/440 |
| 2005/0022890 A1 * | 2/2005 | Demchick | 137/899 |
| 2005/0098627 A1 * | 5/2005 | Chase | 235/382 |
| 2006/0085232 A1 * | 4/2006 | Rice | 705/5 |

OTHER PUBLICATIONS

Lomasky, L.E. Autonomy and Automobility. Independent Review, vol. 2, No. 1, Summer 1997, p. 5.*

* cited by examiner

*Primary Examiner*—Akiba K Robinson Boyce
(74) *Attorney, Agent, or Firm*—Sughrue Mion, PLLC (57) ABSTRACT

A camping reservation system receives camping reservations from a camping facility agent or a user of a camping facility. The agent or the user enters information relating to the user, the user's camping vehicle, camping accommodations requested by the user, and reservation information. The reservation information is transferred to a transaction processor via a communications link, where the processor automatically generates transaction documents related to the user, the camping facility agent, and the camping reservation. A confirmation document is sent to the camping facility for which a camping pad has been reserved.

19 Claims, 5 Drawing Sheets

| id | Description | Class | Height | Width | Length | Weight | Tip-out clearance |
|---|---|---|---|---|---|---|---|
| 001 | Coachmen 401 TS | A | 12'1" | 8'6" | 40' | 31000 | 2'6" |
| 002 | Winnebago Vista | C | 10'3" | 7'3" | 21'4" | 9275 | n/a |
| 003 | Winnebago Minnie 32G | C | 11'4" | 8'6" | 32'1" | 20000 | 8" |

FIG. 4

| _pad | Description | Access | Foliage height | Width | Length | Bath | Power pedestal |
|---|---|---|---|---|---|---|---|
| p1 | site 1 | through | 20' | 25' | 90' | 200' | 1' |
| p2 | site 2 | normal | n/a | 50' | 60' | 400' | 1' |
| p3 | site 3 | normal | 15' | 10' | 25' | 30' | 1' |

CAMPING RESERVATION SYSTEM, METHOD AND PROGRAM

TECHNICAL FIELD

The present invention is directed to an automated camping reservation system, method, and program, and more particularly to a network based system, method and program for reserving a camping facility using any Internet-type accessible medium to receive and process camping facility reservations from camping facility employees and users.

BACKGROUND ART

Reservation systems, such as those for reserving hotel rooms and airplane seats, were among the earliest targets of automation. These systems have matured to the point where, today, the consumer can make his own reservation over the Internet. One of the factors that contributed to the early automation of such systems is the substantial fungibility of the seats or rooms. That is to say, although one airline seat or hotel room may have some particular attributes or desirability factors that affect desirability of the unit (i.e., aisle or window, king or double bed), the units are generally all equally well suited to accommodate the person or persons reserving them. The desirability factors, though not without importance, become less important when a plane or hotel is nearly booked, and a person needs a seat on the plane or a room in the hotel. People are often willing to overlook desirability factors in such situations, because the reserveable units can indeed properly perform the intended function for any person.

Similar reservation systems for fungible units exist also for reserving rental cars, stadium seats, cruise ship cabins, doctor visits, and a myriad of other products and services.

No suitable reservation system has heretofore been developed, however, for the camping industry. Previous attempts to use or adapt hotel-type reservation systems in the camping industry have been made, and have failed. There are reasons why such attempts have been unsuccessful, as will now be explained.

Although the particulars of the camping industry will be familiar to many, a brief overview of the industry will now be provided for the sake of background and to set out some terms to be used in the remainder of the discussion.

As a recreational activity, many persons enjoy leaving their home and spending the night in a fixed location other than in a building. Although such locations might include a tent or the bare ground, today such locations are often vehicles specially designed for overnight accommodation. Such vehicles include at least beds, but may also be equipped with a toilet, shower, bath, kitchen, dining area, living area, computer, television, etc. Having many of the conveniences of home, it is not surprising that such vehicles have sometimes been referred to as mobile homes. For the sake of generality and simplicity, however, it will be understood that any vehicle having at least a sleeping area will be referred to hereafter as a camping vehicle. It will also be understood that the meaning of the term is meant to be inclusive of vehicles that are towed as well as those with the capability of moving without being towed.

The persons who stay in camping vehicles will be referred to as campers. The term generally excludes people staying in a hotel. For the sake of this discussion, people having non-camping vehicles but who stay in tents, and also people who travel without any vehicle at all are of no particular interest and are usually not included when the term "campers" is used herein.

Campers can drive their camping vehicles on almost any road, and park them in many convenient locations. Some businesses have developed to serve campers and provide them with excellent facilities to park their camping vehicles for overnight stays. Such businesses are typically referred to as campgrounds, but usually will be referred to herein as camping facilities for the sake of generality. A business operating more than one camping facility may be referred to as a camping institution.

A camping facility has several predetermined locations in which campers may park their camping vehicles. Each of these locations may be referred to as a campsite or a camping pad. Camping pads are not all alike, and each possesses attributes which severely complicate the process of making a reservation for a camper's camping vehicle. Furthermore, camping vehicles are not all alike, and have different requirements that must be fulfilled by a suitable camping pad.

Figure 5:
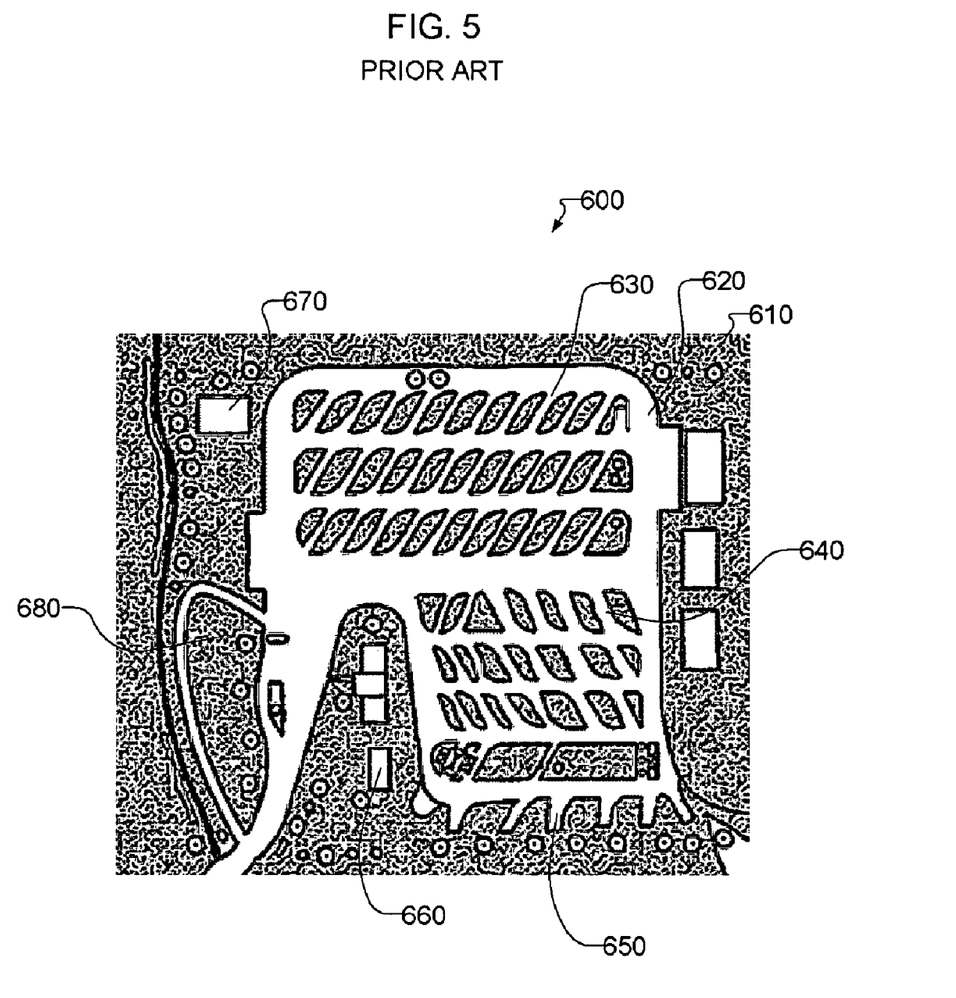
FIG. 5 shows an exemplary campground.

FIG. 5 shows an exemplary camping facility. In FIG. 5, reference numeral 600 refers generally to the camping facility. Non-paved areas are indicated with a grassy texture, such as that at 610. Paved areas are not textured, as shown at 620. A camping pad is indicated at the paved area 630, and this type of camping pad allows a user to pull his camping vehicle through the pad so that, upon departing, there is no need to back out the vehicle. At 640 there is a camping pad that allows for pull through as in pad 630, but the pad is significantly wider than pad 630. Camping pad 650 is wide, but does not allow for pull through. A pool 660 is provided as a camping facility amenity, as is picnic area 670. Primitive tent area 680 is provided for persons who do not have camping vehicles.

Camping pad attributes and camping vehicle attributes will be discussed in further detail below, but a few will be mentioned now to help give a basic appreciation of the reasons that typical hotel reservation systems are unsuitable in the camping industry.

One camping pad attribute is the location of the power pedestal. The power pedestal of a camping pad is a permanent camping pad fixture that includes at least a connector for providing electrical power. Another camping pad attribute is the height of the power pedestal. The power pedestal may be anywhere from a few inches to several feet in height. The height and location of the power pedestal may be thought of as power pedestal particulars, for the sake of linguistic convenience.

One camping vehicle attribute is the presence or absence of a tip-out portion. A tip-out portion of a camping vehicle is a part of the vehicle which does not substantially protrude from the camping vehicle during movement, but which can be extended from the camping vehicle in a stationary state to provide additional interior space. Some camping vehicles have multiple tip-out portions, and these can extend from the camping vehicle for several feet. Another related camping vehicle attribute is the ground clearance of any tip-out portion. That is to say, some tip-out portions of some camping vehicles may, when fully extended and deployed, have only about a foot of space between the bottom of the tip-out portion and the level of the ground. These attributes of the camping vehicle may, for linguistic convenience in this illustration, be thought of as tip-out portion particulars.

To make a proper pairing of a given camping vehicle with a given camping pad, it should be determined ahead of time whether the tip-out portion, when deployed, will inevitably collide with the power pedestal, may possibly collide with the power pedestal, or is free from the possibility of a collision between the two. Current reservation support systems are incapable of such determinations and frequently make improper pairings.

Heretofore, when campers have made reservations at camping facilities, no automated systems have ever existed to ensure proper consideration of camping pad attributes in combination with camping vehicle attributes. For example, reservation determinations have not been heretofore made with the support of a system that automatically takes into account such factors as the above-identified power pedestal particulars for a given camping pad and also the above-identified tip-out portion particulars for a given camping vehicle, to arrive at an appropriate camping pad/camping vehicle pairing. Wrong reservation determinations are often made.

It will be appreciated that the few, brief technical points noted above with respect to camping pad and camping vehicle attributes are merely illustrative of just some considerations that make reservation determinations for camping facilities extremely complicated. Other attributes require consideration as well, and these will be discussed in more detail below. These points do show, however, that camping pads are not fungible units, and that camping vehicles cannot all be equally well accommodated by any given camping pad.

The reasons just outlined are among those that make the use of hotel-like reservation systems completely unsuitable for the camping industry. In hotel-like reservation systems, rooms are assumed to be fungible; guests to be housed in the rooms are always assumed to fit in the rooms; the fixtures in the rooms are always assumed to be of appropriate size and quality to suit the guest. Such reservation systems can make such simple assumptions, and still be used with effect in the hotel industry, because the "thing" for which space is provided is a human body and because the human body has generally predictable and constant attributes. Camping vehicles vary widely, and so reservation systems for hotels are far too simple to be used in the camping industry.

Because of these complicated camping pad and camping vehicle attributes, the process of reserving a camping pad in a camping facility is often labor intensive, slow, and inaccurate. Reliance is almost completely on the knowledge of the service agent at the campsite to explain and describe the camping pad attributes to the camper, who is assumed to be knowledgeable about his camping vehicle.

In establishing a reservation for a user, the camping facility agent would acquire a user's personal information, reservation information, vehicle information and payment information. Depending on the user and the user's specifications, this can require a lengthy amount of information which the camping facility agent will have to inquire of the user and subsequently input into the camping facility system or manually record. This would also require a camping facility agent to relay to the user what camping facilities are available to the user based upon the user's specifications and preferences. Furthermore, since this information is not within the view of the user, the user would have to write and record the information as well. If the user is not familiar with the camping facility or with camping in general, the camping facility agent would be required to explain to the user what facilities and accommodations are available to the user. The foregoing require a great amount of camping facility agent's time.

When the camping facility agent has acquired all the information necessary to make a camping reservation, the camping facility agent would consequently send the user their camping facility information either via mail or facsimile or would verbally inform the user of their camping information which the user would consequently have to record.

Many users who would like to make a camping reservation are not new to camping or are familiar with making camping reservations. Some users may regularly visit a particular camping facility or various camping facilities of a particular camping institution that they are designated as a frequent user. According to the camping reservation systems currently available, a user who is more knowledgeable of camping will perform the same steps necessary for making a camping reservation as that of a new or infrequent user of camping facilities. Furthermore, current camping reservation systems do not request sufficient information from a user in order to obtain an appropriate camping location.

However, since there are limited camping facility agents, a frequent user will be required to wait until a camping facility agent is free to take their reservation. Camping facility agents may only be available during certain hours or may be assisting other users, further increasing the inconvenience of making a camping reservation.

Presently, there are various network based reservation systems available for making hotel reservations, plane reservations or vehicle reservations, however, there are no suitable network based reservation systems that can make camping pad reservation determinations based on camping pad attributes and also on camping vehicle attributes.

There is a serious need for such a system, however, to improve the quality of reservation determinations, and also to fulfill user desires to make a camping reservation prior to arriving at a camping facility and without substantial interaction with a camping facility agent.

INDUSTRIAL APPLICABILITY

The invention provides a suitable computer-assisted system, method, and computer program product for overcoming some or all of the above-identified problems, and for achieving other helpful advantages as well, by supporting reservation determinations based on camping pad attributes, camping vehicle attributes, or both. The invention is taught herein by way of the exemplary embodiments described in detail below.

DESCRIPTION OF DRAWINGS

The drawing figures depict, in highly simplified schematic form, embodiments reflecting the principles of the invention. Many items and details that will be readily understood by one familiar with this field have been omitted so as to avoid obscuring the invention.

DISCLOSURE

The invention will now be taught using various exemplary embodiments. Although the embodiments are described in detail, it will be appreciated that the invention is not limited to just these embodiments, but has a scope that is significantly broader. The appended claims should be consulted to determine the true scope of the invention.

Figure 1:
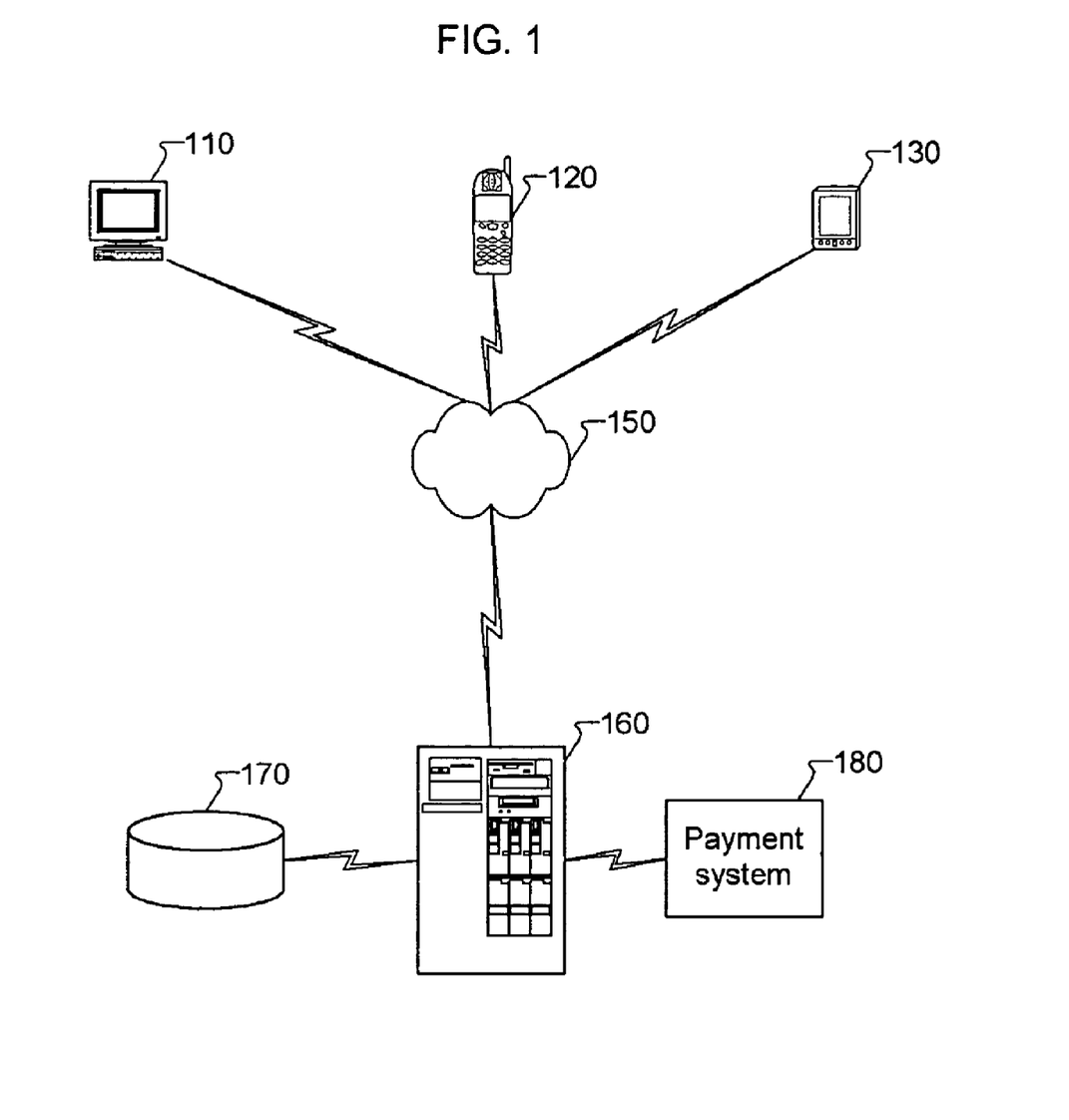
FIG. 1 is a block diagram of a network according to the present invention.

Referring to FIG. 1 a block diagram is shown representing the camping reservation system, method and program of the present invention. A camp facility agent or a user contacts the system via a network such as the Internet. Any medium such as a computer 110, cellular phone 120, or any device 130 which has access to the network can be used to establish a connection with the camping institution system 160 and associated database 170 containing information relative to the camping institution and camping facilities of the camping institution.

Figure 2:
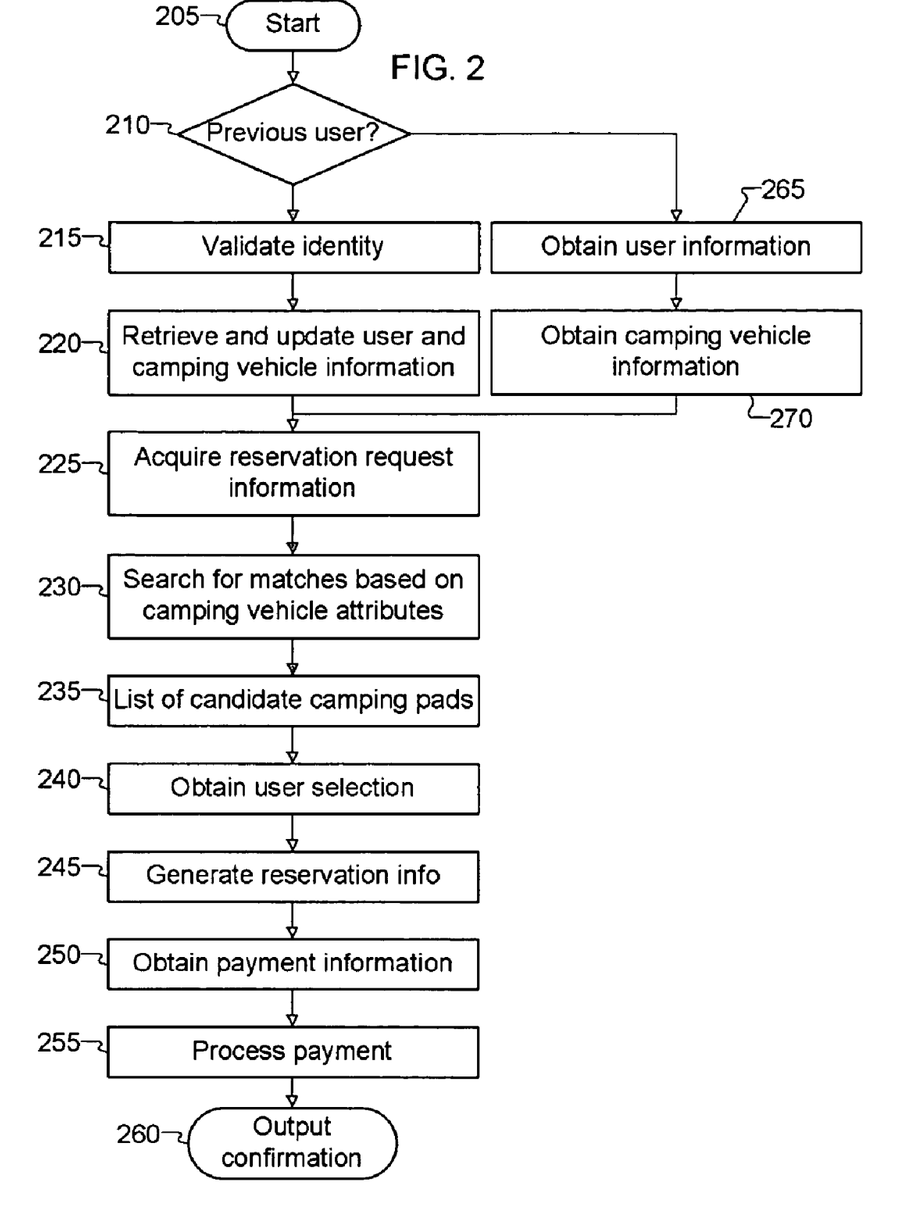
FIG. 2 is a flow diagram showing exemplary steps of reserving a camping pad by a user according to one aspect of the present invention.

FIG. 2 is a flowchart illustrating the making of a reservation by a user according to the first embodiment. At step 205 a user accesses a website for a camping institution using for example, a computer. A link for example, on a website will direct the user an area on the website regarding reservations. The user will be able to make reservations, inquire about reservations that have already been made or to inquire about possible reservations when accessing this site.

If the user is a previous or frequent camper at the camping institution, they will be directed to a link for frequent users step 210 as further described below. If the user is new to the camping institution or an infrequent camper in that the user's personal information is not stored in the camping institution database, the user will be directed to a link for new and infrequent users in step 210.

If the user is a new or infrequent user, at step 265 the user enters personal information such as name, home address, telephone number. At step 270 the user enters vehicle information such as size of the camping vehicle, make and model. A feature of the present invention is that the vehicle information requested of a user is particular to camping vehicles. Other pertinent vehicle information would include information regarding the length, weight, and dimensions of the vehicle or whether any components of the vehicle can be expanded.

Further requested vehicle information would include information regarding any attachments to the vehicle such a boat or car. Obtaining this vehicle information would ensure that the camping location reserved for the user appropriately accommodates the user during the length of the user's stay at the camping facility.

For example, if the user's camping vehicle is expandable, acquiring information regarding the dimensions of the expandable components would ensure that the power pedestal or foliage for example, would not prohibit the user from expanding their vehicle. In other words, the system would elicit from the user the tip-out portion particulars.

Additional vehicle information which will be requested of a user would include power pedestal attributes necessary for the user and the user's camping vehicle. For example, power pedestals vary in height, size and other attributes. Therefore, a power pedestal which can accommodate the camping vehicle is necessary. Otherwise, extra cables or means of connecting to the power pedestal will be necessary.

At step 225 the user will enter camping accommodation preferences. The camping accommodations available to the user will depend upon the camping facility selected by the user. For example, the user may require a connection to a phone line, that they be near the front desk, or that there be accommodations for their pets. Common accommodations requested by user's are sewer and water connections or that the camping location be near public washrooms or washing machines. The user may also like to be a certain distance from a lake, if a lake is present on the camping facility or be located in a particular scenic view on a camping facility.

Further accommodations would include camping pad preferences. There are various kinds of camping pads on which the camping vehicle is placed. Camping pads in some camping facilities may vary. For example, there can be concrete, asphalt, gravel or grass camping pads. The camping pad available to a user may be limited depending on the weight and size of the camping vehicle.

At step 225 the user will also enter their reservation information. Reservation information would include information regarding the location of the particular camping facility the user would like to stay, the dates of the user's arrival and departure, and the number of people who will be staying at the camping facility.

Camping institutions often have various camping facilities located in different states and different camping facilities within a state.

Once the user has completed entering the vehicle information, reservation information and accommodation preferences, the database of the system of the present invention will be accessed in step 230 and camping facility information will be obtained. In step 235, the system will provide the user with the camping locations and camping pads of the camping facility selected by the user, which are available and provide a satisfactory match taking into account the camping pad attributes and the camping vehicle attributes, and also the accommodation preferences. The user can then select among the available camping locations on a camping facility which satisfy the user's specifications. This step 235 will be discussed further below.

Sometimes, there might not be a camping location on a camping facility which can satisfy all of a user's preferences. In this case, the user will be informed that there is no camping location on a camping facility which can satisfy all of the user's requirements and the user will be given the option of generating alternative camping locations within a camping facility or the system will generate camping locations which satisfies the user's specifications but at a different camping facility. At step 235, if there is no camping pad in the camping facility which can satisfy all of the users specifications, the system may provide the user with other alternatives. For example, the system will provide the user with alternative camping pads currently available at the camping facility which is similar to the user's specifications but is available on a different date.

If the user is not satisfied with any of the camping locations available to them, the user may can modify the information previously entered. For example, the user can change the dates of their reservation. If there are no available camping facilities in the particular camping site, the system will inform the user of camping facilities available to the user at another camping site meeting the user's specifications. Thus a camping, facility that more greatly meets a user's preferences is provided.

At step 240 the user selects a camping location. Once the user has selected a camping location, at step 245 the user may be prompted to enter any further necessary user information. Once the system has all necessary user and camping facility information, the system in step 245 will generate reservation information, such as a display of relevant user information, vehicle information, and accommodation information, and may request verification from the user that the information is accurate. When the user indicates that all of the information is accurate, at step 250 the user may be prompted to input the user's payment information. Payment information can include a credit card number, the name of the person identified on the credit card, the type of credit card, the expiration date and billing address of the credit card. When the user has completed entering the payment information, the system processes the payment information in step 255.

The payment information is transmitted to a payment verification system 180 which verifies the validity of the credit card and the payment information. Once verification of the payment information has been established, the final confirmation information may be output to the user.

Once the reservation has been completed, the camping system will update its database to ensure that the reservation information available to users is accurate. At any point when the user is entering the user's user information, vehicle information, reservation information etc, a record may be saved so that the user may stop and input the rest of the information at another time.

If the user is a previous or frequent user, the user's user information, vehicle information accommodation preferences and payment information may currently be stored in the camping system. If the user is a frequent user or the user has previously entered their information, they will already have a user ID and password, for example. If the user has a user ID and a password, they will be able to access their information by inputting their user ID and password into the system. Therefore, there is no need to input information that will remain the same avoiding redundancy.

At step 215 after the user has completed entering the user's ID and password, processing proceeds to step 220 in which the user's user information, vehicle information, accommodation information and payment information which was previously stored may be displayed. The system could also display any history information which describes any previous reservations made by the user at the camping facility.

A user may decide to change any or all of the user information, vehicle information, or accommodation information currently stored on the system. If a user wants to change their information or needs to add information, the user can alter the stored information.

Once the update is completed, processing can continue with step 225 as already described above.

In another embodiment of the present invention, if the user is a new user or does not have a pending account at the camping institution, the user may be offered deals, discounts, promotions that are available.

In another embodiment, the user may belong to a frequent camper club, similar to a frequent flyer program, with appropriate awards. The system 160 can keep track automatically of camping stays, and can inform the user of any discounts or coupons available to the user based on their account information. For example, if the user has previously made 10 reservations at the camping institution, the user may be offered a free stay at a camping institution.

In another embodiment, if the user has spent a certain amount of money at a camping facility, there may deals, discounts or coupons available to them. The user is then informed of any deals, discounts or coupons available to them which may be a factor in determining where, when, how long the user's next reservation will be.

A brief discussion will now be provided of one straightforward manner by which step 235 may be carried out. Database 170 may be provided with camping vehicle information such as that shown in FIG. 3 and with camping pad information such as that shown in FIG. 4.

Figure 3:
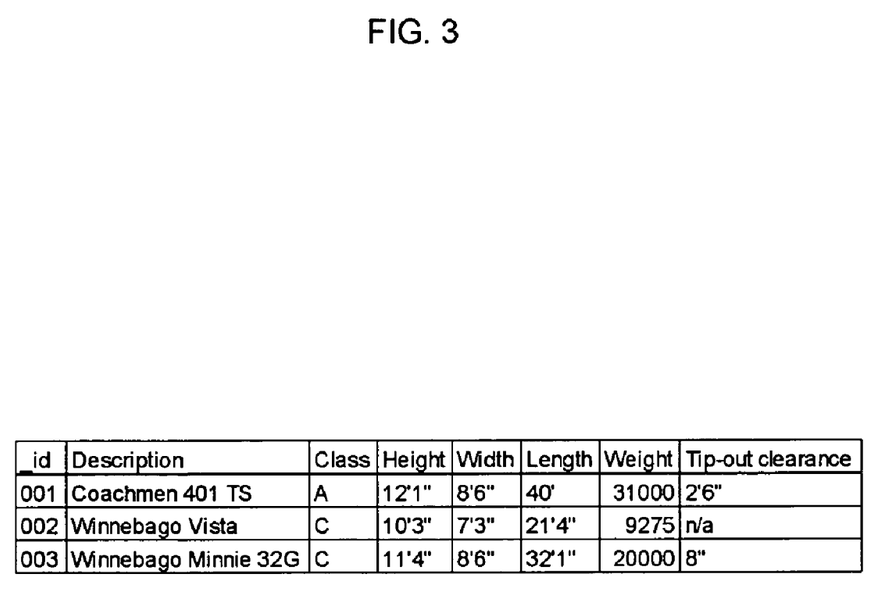
FIG. 3 shows a simplified portion of an exemplary database, relating to camping vehicles.

The camping vehicle information exemplified in FIG. 3 represents relations between data elements in, e.g., a relational database. In the table shown, a first column is provided for easy identification of individual records, and may be a key field or the like. The next column provides a textual description of a make and model of camping vehicle. Camping vehicles are commonly referred to as being of various types or classes, and a column is provided for this kind of information. Other columns indicate outer dimensions and weight of the camping vehicle. The final column indicates the minimum tip-out clearance value.

Figure 4:
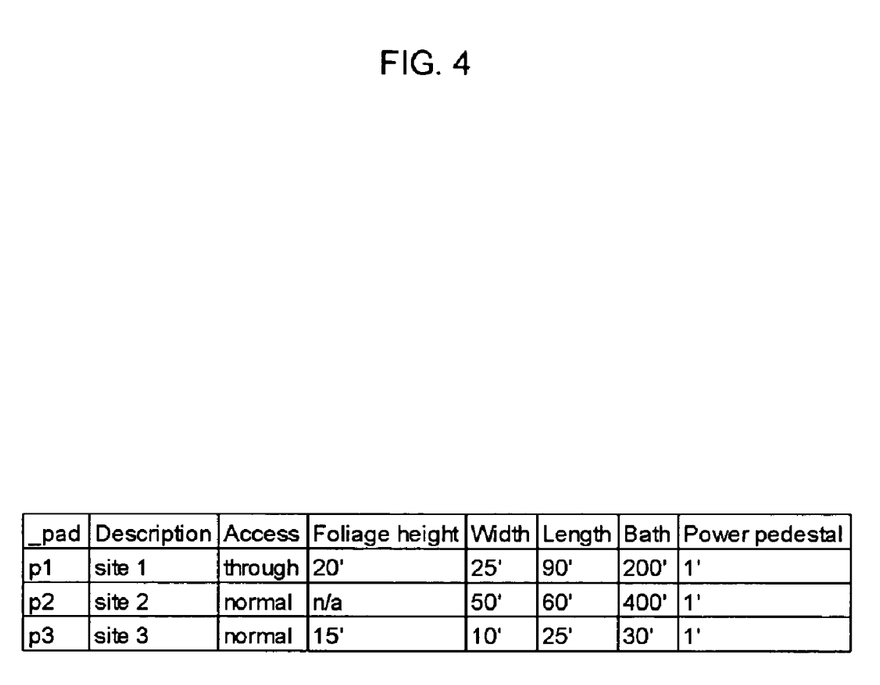
FIG. 4 shows another simplified database portion, relating to camping pads.

The camping pad information exemplified in FIG. 4 is likewise shown in this exemplary embodiment as being in tabular form. The table has a first column with identifiers of individual camping pads. The second column provides a textual description of the camping pad. Other columns hold information indicating the type of access for the pad (i.e., whether pull through or not), the dimensions of the pad, the distance from an amenity such as a bath house, and a power pedestal height value.

With reference again to FIG. 2, it will be recalled that the camping vehicle information for the user is obtained in steps 220 or 270. Inasmuch as the major manufacturers of camping vehicles are few in number, it is quite practical to provide and keep updated a table such as that shown in FIG. 3. Thus, knowledge of the camping vehicle type makes it simple to determine the basic information for the camping vehicle.

It will also be recalled that the camping facility at which the user desires a pad reservation is indicated in step 230. Once the camping facility is identified, a table like that shown in FIG. 4 may be referenced to obtain information about all of the pads in the facility.

Carrying out step 235 can be performed in a simple or complex manner. One simple approach is to compare the dimensions of the camping vehicle with the camping pad, and to rule out pads of insufficient size, or pads where the foliage might come into contact with the top of the camper. Threshold values can be established as necessary (for example, a rule that the foliage should not be less than 10 feet above the top of the camping vehicle).

A more complex approach is to take into account the tip-out clearance and the height of the power pedestal. An even more complex approach is to store information concerning the location of the tip out(s) for various camping vehicles and camping pads, and to make a determination based on not only the clearance of the tip out(s), but also the possibility of locating a vehicle of the known dimensions in the pad taking into account the tip out and pedestal locations.

Other factors could be taken into account, such as pad composition vis-à-vis camping vehicle weight, and many others too numerous to name here. Each factor taken into account can potentially improve the chances of making a "perfect" pairing between camping vehicle and candidate camping pads. At least, the rules employed in the process of making reservation determinations and providing indications of candidate camping pads, based on the respective camping pad attribute information of the camping pads of the camping facility and the camping vehicle attributes for the given camping vehicle, should avoid pairings in which the pad is unsuitable for the vehicle.

Of course, those familiar with this field will appreciate that pads already reserved for other customers should not be considered as candidate pads.

Having described in detail various embodiments of the invention, there will be provided a description of various camping pad attributes that may form the basis for a reservation determination (i.e., a determination that a camping pad is a good match for a given camping vehicle).

One camping pad attribute is the camping pad access attribute. Some camping pads are arranged so that a camping vehicle can pull into and out of the camping pad without backing up. These can be driven through by virtue of sufficient room around the camping pad to maneuver the camping vehicle. This is important to campers with large camping vehicles because such campers may be averse to backing up their camping vehicle.

Another camping pad attribute is the foliage attribute. Some camping pads have foliage that may be high enough to permit safe passage of certain camping vehicles, but not others. Some campers prefer no foliage whatsoever because they may have electronic devices that link with satellite services via a line of sight, or because they may have external antennae or other devices that might be damaged by nearby foliage. Some campers prefer overhanging foliage because they may have camping vehicles that lack air conditioning.

Another camping pad attribute is the camping pad composition. Some camping pads have only an unimproved earth surface, while others may have gravel, concrete, or asphalt pads.

Another camping pad attribute is the distance from various camping facility features. For example, some camping pads are close to the entrance and some are far away. Campers preferring seclusion or having difficulty sleeping may prefer being far from the entrance. Likewise, some camping pads are close to shower facilities or other amenities of the camping facility, and this may be an important factor for a camper who has some mobility limitations. Moreover, some camping pads are close to the camping facility headquarters and thus may provide a greater sense of security or improved wireless communication with a WLAN access point.

Yet another camping pad attribute is the availability of certain communications features, such as telephone, CATV, and Ethernet connections.

Various camping vehicle attributes have already been mentioned, such as vehicle dimensions including height, weight, length, and width; tip-out portion particulars; and location of connections for hook-up to power and sewage facilities. Other attributes may be important as well, such as turning radius, wheelbase, and tolerance for slopes.

Many variations to the above-identified embodiments are possible without departing from the scope and spirit of the invention. Possible variations have been presented throughout the foregoing discussion. Moreover, it will be appreciated that the particular formats, tables, topology, and type of database shown in the examples above are for the sake only of providing a concrete example, and are not intended to limit the invention.

The actual implementation can differ from that shown in FIGS. 1-4. The system need not be based on any particular networking technology. The system need not be centralized as shown in FIG. 1, but may be distributed in any way as the needs of the situation arise. The payment system need not necessarily be a separate system. The flow of processing shown in FIG. 2 may also be changed, with various steps being rearranged, other steps being added, and still other steps being omitted so as to suit the particulars of any given camping institution environment.

Combinations and subcombinations of the various embodiments described above will occur to those familiar with this field, without departing from the scope and spirit of the invention. Although the invention has been described in some detail above by way of various exemplary embodiments, the scope of the invention is defined below in the appended claims.

The invention claimed is:

1. A camping facility reservation method, for making a camping facility reservation, comprising:
   storing respective camping pad attribute information for camping pads of a camping facility;
   storing camping vehicle attribute information for a given camping vehicle;
   obtaining reservation request information concerning the camping facility and the given camping vehicle; and
   providing, by a computer processor, an indication of one or more candidate camping pads based on the respective camping pad attribute information of the camping pads of the camping facility and the camping vehicle attributes for the given camping vehicle,
   wherein the camping pad attribute information includes information regarding the geographic location and availability of at least one of water and sewer connections on the camping pad.

2. The reservation method as set forth in claim 1, wherein the camping vehicle attribute information comprises one or more of:
   tip-out portion particulars,
   wherein the tip-out portion particulars includes information on location and dimensions of the tip-out portions;
   location of connections for hook-ups on the camping vehicle;
   and tolerance for slopes.

3. The reservation method as set forth in claim 1, wherein the camping pad attribute information comprises one or more of:
   power pedestal particulars;
   pad access attributes;
   pad foliage;
   pad composition;
   pad distance from camping facility features; and
   availability of communications features including one or more of telephone, CATV, and network connections.

4. A camping reservation method, for making a camping facility reservation, comprising:
   receiving a customer request for making a reservation at a camping facility, including camping vehicle attribute information;
   searching, a camping institution database for information relating to the camping reservation, the database comprising camping pad attribute information of camping facilities belonging to the camping institution; and
   generating, by a computer processor a camping reservation at a camping facility responsive to the customer request; wherein the camping pad attribute information includes information regarding the geographic location and availability of at least one of water and sewer connections on the camping pad.

5. The camping reservation method according to claim 4, further comprising providing a user with alternative camping facility information when a reservation cannot be made according to the camping vehicle attribute information and the camping pad attribute information.

6. The camping reservation method according to claim 4, further comprising generating one or more of promotional information, discounts, and coupons according to a user's account information.

7. The camping reservation method according to claim 4, wherein the camping vehicle attribute information comprises one or more of sewer connection information, water connection information and phone line connection information.

8. The camping reservation method according to claim 4, wherein the camping vehicle attribute information comprises camping vehicle attachment information relating to one or more of a boat, a trailer, and a motor vehicle.

9. The camping reservation method according to claim 4, wherein the camping vehicle attribute information comprises a make and model of the camping vehicle.

10. The camping reservation method according to claim 4, wherein the camping vehicle attribute information comprises dimensions of the camping vehicle.

11. The camping reservation method according to claim 4, wherein the camping vehicle attribute information comprises information regarding expandable portions of the camping vehicle.

12. The camping reservation method according to claim 4, wherein the camping vehicle attribute information comprises a date of arrival and a date of departure at the camping facility.

13. The camping reservation method according to claim 4, wherein the camping vehicle attribute information comprises the number of people who will be staying at the camping facility.

14. The camping reservation method according to claim 4, wherein the camping pad attribute information comprises a location of a camping pad within the camping facility of a camping institution.

15. A camping reservation method for making a camping facility reservation comprising:
- accessing a website of a camping institution;
- accessing a reservation area of said website;
- acquiring camping vehicle attribute information comprising information about a camping vehicle to be placed on the camping facility;
- acquiring reservation information for making a reservation at a camping facility;
- acquiring user accommodation information comprising information about user preferences at the camping facility;
- searching a camping institution database containing camping pad attribute information regarding camping facilities of the camping institution;
- generating, by a computer processor, camping facility reservation information according to the camping vehicle information, the reservation information and the accommodation information;
- reserving a camping facility according to the camping vehicle information, the reservation information and the accommodation information; and
- acquiring payment information for payment of the camping facility reservation
- wherein the camping pad attribute information includes information regarding the geographic location and availability of at least one of water and sewer connections on the camping pad.

16. A computer system carrying out a camping reservation method for making a camping facility reservation, the method comprising:
- accessing a website of a camping institution;
- accessing a reservation area of said website;
- acquiring camping vehicle attribute information comprising information about a camping vehicle to be placed on the camping facility;
- acquiring reservation information for making a reservation at a camping facility;
- acquiring user accommodation information comprising information about user preferences at the camping facility;
- searching a camping institution database containing camping pad attribute information regarding camping facilities of the camping institution;
- generating, by a computer processor, camping facility reservation information according to the camping vehicle information, the reservation information and the accommodation information;
- reserving a camping facility according to the camping vehicle information, the reservation information and the accommodation information; and
- acquiring payment information for payment of the camping facility reservation
- wherein the camping pad attribute information includes information regarding the geographic location and availability of at least one of water and sewer connections on the camping pad.

17. A computer program product for implementing a camping reservation method for making a camping facility reservation, the method comprising:
- accessing a website of a camping institution;
- accessing a reservation area of said website;
- acquiring camping vehicle attribute information comprising information about a camping vehicle to be placed on the camping facility;
- acquiring reservation information for making a reservation at a camping facility;
- acquiring user accommodation information comprising information about user preferences at the camping facility;
- searching a camping institution database containing camping pad attribute information regarding camping facilities of the camping institution;
- generating, by a computer processor, camping facility reservation information according to the camping vehicle information, the reservation information and the accommodation information;
- reserving a camping facility according to the camping vehicle information, the reservation information and the accommodation information; and
- acquiring payment information for payment of the camping facility reservation
- wherein the camping pad attribute information includes information regarding the geographic location and availability of at least one of water and sewer connections on the camping pad.

18. A camping reservation method as set forth in claim 15, wherein the camping vehicle attribute information comprises tip-out portion particulars, which include information regarding location and dimensions of the tip-out portions.

19. A camping facility reservation method, for making a camping facility reservation, comprising:
- storing respective camping pad attribute information for camping pads of a camping facility;
- storing camping vehicle attribute information for a given camping vehicle;
- obtaining reservation request information concerning the camping facility and the given camping vehicle; and
- providing, by a computer processor, an indication of one or more candidate camping pads based on the respective camping pad attribute information of the camping pads of the camping facility and the camping vehicle attributes for the given camping vehicle; and
- wherein the camping pad attribute information includes information regarding the geographic location and availability of utility connections on the camping pad.

* * * * *